(12) United States Patent
Tagami et al.

(10) Patent No.: US 11,054,892 B2
(45) Date of Patent: Jul. 6, 2021

(54) INFORMATION PROCESSING APPARATUS AND POWER SOURCE CONTROL METHOD

(71) Applicant: LENOVO (SINGAPORE) PTE. LTD., Singapore (SG)

(72) Inventors: Yuta Tagami, Yokohama (JP); Hideshi Tsukamoto, Yokohama (JP); Yohichi Kozasu, Yokohama (JP); Yoshihiro Takase, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 47 days.

(21) Appl. No.: 16/746,642

(22) Filed: Jan. 17, 2020

(65) Prior Publication Data

US 2021/0124411 A1 Apr. 29, 2021

(30) Foreign Application Priority Data

Oct. 29, 2019 (JP) .............................. JP2019-196099

(51) Int. Cl.

| | |
|---|---|
| *G06F 1/26* | (2006.01) |
| *G06F 1/32* | (2019.01) |
| *G06F 1/3296* | (2019.01) |
| *H02J 7/00* | (2006.01) |
| *G06F 1/28* | (2006.01) |
| *G06F 1/3212* | (2019.01) |

(52) U.S. Cl.
CPC ............ *G06F 1/3296* (2013.01); *G06F 1/263* (2013.01); *G06F 1/28* (2013.01); *G06F 1/3212* (2013.01); *H02J 7/0063* (2013.01); *H02J 7/0068* (2013.01)

(58) Field of Classification Search
CPC .......... G06F 1/3296; G06F 1/263; G06F 1/28; G06F 1/3212
See application file for complete search history.

(56) References Cited

U.S. PATENT DOCUMENTS

| | | | | |
|---|---|---|---|---|
| 2009/0077393 | A1* | 3/2009 | Nakamura ................ | G06F 1/26 713/310 |
| 2011/0222322 | A1* | 9/2011 | Kris ........................ | H02M 1/36 363/49 |
| 2015/0331754 | A1* | 11/2015 | Grobelny ................ | G06F 9/441 714/23 |

FOREIGN PATENT DOCUMENTS

| | | |
|---|---|---|
| JP | H0251335 A | 2/1990 |
| JP | H0654457 A | 2/1994 |
| JP | 2001236131 A | 8/2001 |

(Continued)

*Primary Examiner* — Mark A Connolly
(74) *Attorney, Agent, or Firm* — Shimokaji IP (57) ABSTRACT

An information processing apparatus includes a first power source generation unit configured to generate a first voltage lower than a predetermined supply voltage based on at least power supplied from a battery, from a supply voltage power source of the predetermined supply voltage, and output the first voltage as a first voltage power source; a second power source generation unit configured to generate a second voltage lower than the first voltage and used when at least a system is activated, and output the second voltage as a second voltage power source; and a power source switching unit configured to switch the supply voltage power source with the first voltage power source to supply the first voltage power source to the second power source generation unit, and cause the second power source generation unit to generate the second voltage power source from the first voltage power source.

7 Claims, 7 Drawing Sheets

(56) References Cited

FOREIGN PATENT DOCUMENTS

| | | |
|---|---|---|
| JP | 2014160326 A | 9/2014 |
| WO | 2018061590 A1 | 4/2018 |

* cited by examiner

| PGPIO | VOUT |
|---|---|
| Low | VREGIN20 |
| High | VCC5M |

| STATE OF SUPPLY POWER SOURCE | BATTERY | | | | EXTERNAL POWER SOURCE | | | |
|---|---|---|---|---|---|---|---|---|
| SYSTEM STATE | S0/S0ix | S3 | S4 | S5 | S0/S0ix | S3 | S4 | S5 |
| VREGIN20 | ON | ON | ON | ON | ON | ON | ON | ON |
| VCC3SW | ON | ON | ON | ON | ON | ON | ON | ON |
| VCC3M | ON | ON | OFF | OFF | ON | ON | ON | ON |
| VCC5M | ON | ON | OFF | OFF | ON | ON | ON | ON |

FIG. 8

INFORMATION PROCESSING APPARATUS AND POWER SOURCE CONTROL METHOD

FIELD OF THE INVENTION

The present invention relates to an information processing apparatus and a power source control method.

BACKGROUND OF THE INVENTION

In recent years, a technology of providing a low power consumption state (for example, an S0ix state) in which power can be restored by event-driven an operating system (an OS) or an application to an information processing apparatus such as a laptop PC (a notebook personal computer) is known. For example, a modern standby using such an S0ix state is installed on Windows 10 (Windows is a registered trademark), and it is possible to execute a predetermined process in a background while realizing low power consumption in which a display is stopped by the modern standby.

In addition, in the information processing apparatus such as a laptop PC, a technology of switching power supply sources according to a state is known (see Japanese Unexamined Patent Application Publication No. 2014-160326, for example).

SUMMARY OF THE INVENTION

Meanwhile, in the information processing apparatus in the related art, for example, in a case of being operated by power of a built-in battery, it is required to further reduce power consumption so as to extend a working time in the low power consumption state such as the modern standby (the S0ix state).

An advantage of some aspects of the present invention for solving the above problem is to provide an information processing apparatus and a power source control method capable of reducing power consumption in a low power consumption state.

In order to solve the problem, according to the first aspect of the present invention, there is provided an information processing apparatus including: a first power source generation unit configured to generate a first voltage lower than a predetermined supply voltage based on at least power supplied from a battery, from a supply voltage power source of the predetermined supply voltage, and output the first voltage as a first voltage power source; a second power source generation unit configured to generate a second voltage lower than the first voltage and used when at least a system is activated, and output the second voltage as a second voltage power source; and a power source switching unit configured to switch the supply voltage power source with the first voltage power source to supply the first voltage power source to the second power source generation unit, and cause the second power source generation unit to generate the second voltage power source from the first voltage power source in a case where the first power source generation unit outputs the first voltage power source.

In the information processing apparatus according to the second aspect of the present invention, in a case where the first power source generation unit stops the output of the first voltage power source, the power source switching unit may supply the supply voltage power source to the second power source generation unit, and may cause the second power source generation unit to generate the second voltage power source from the supply voltage power source.

The information processing apparatus according to the third aspect of the present invention may further include a power source management unit configured to operate by the second voltage power source and cause the first power source generation unit to output the first voltage power source in a case where an activation request for activating the system is received.

The information processing apparatus according to the fourth aspect of the present invention may further include a sub-control unit that is a sub-control unit different from a main control unit that executes a main process of the system, and controls a low power consumption state of the system, and the sub-control unit may perform control of causing the power source switching unit to switch a power source to be supplied to the second power source generation unit from the supply voltage power source to the first voltage power source after an output of the first voltage power source is started, and may perform control of causing the power source switching unit to switch the power source to be supplied to the second power source generation unit from the first voltage power source to the supply voltage power source, and then may output a stop request of the first voltage power source to the power source management unit in a case where the output of the first voltage power source is stopped, and the power source management unit may cause the first power source generation unit to stop the output of the first voltage power source according to the stop request of the first voltage power source.

In the information processing apparatus according to the fifth aspect of the present invention, the predetermined voltage based on either power supplied from the battery or power supplied from an external power source may be supplied to the supply voltage power source, and in a case where the power from the external power source is supplied, the power source management unit may cause the first power source generation unit to constantly output the first voltage power source.

In the information processing apparatus according to the sixth aspect of the present invention, the power source switching unit may include a switch element configured to control connection between a power source line of the supply voltage power source and a power source output line which supplies a power source to the second power source generation unit according to a state of a control terminal, and a diode connected from the first voltage power source to the power source output line in a forward direction.

According to the seventh aspect of the present invention, there is provided a power source control method of an information processing apparatus including a first power source generation unit configured to generate a first voltage lower than a predetermined supply voltage based on at least power supplied from a battery, from a supply voltage power source of the predetermined supply voltage and output the first voltage as a first voltage power source, and a second power source generation unit configured to generate a second voltage lower than the first voltage and used when at least a system is activated and output the second voltage as a second voltage power source, the method including: switching the supply voltage power source with the first voltage power source to supply the first voltage power source to the second power source generation unit, and causing the second power source generation unit to generate the second voltage power source from the first voltage power source in a case where the first power source generation unit outputs the first voltage power source, by a power source switching unit.

The above-described aspects of the present invention can reduce power consumption in a low power consumption state.

DETAILED DESCRIPTION OF THE INVENTION

Hereinafter, an information processing apparatus and a power source control method according to an embodiment of the present invention will be described with reference to the drawings.

Figure 1:
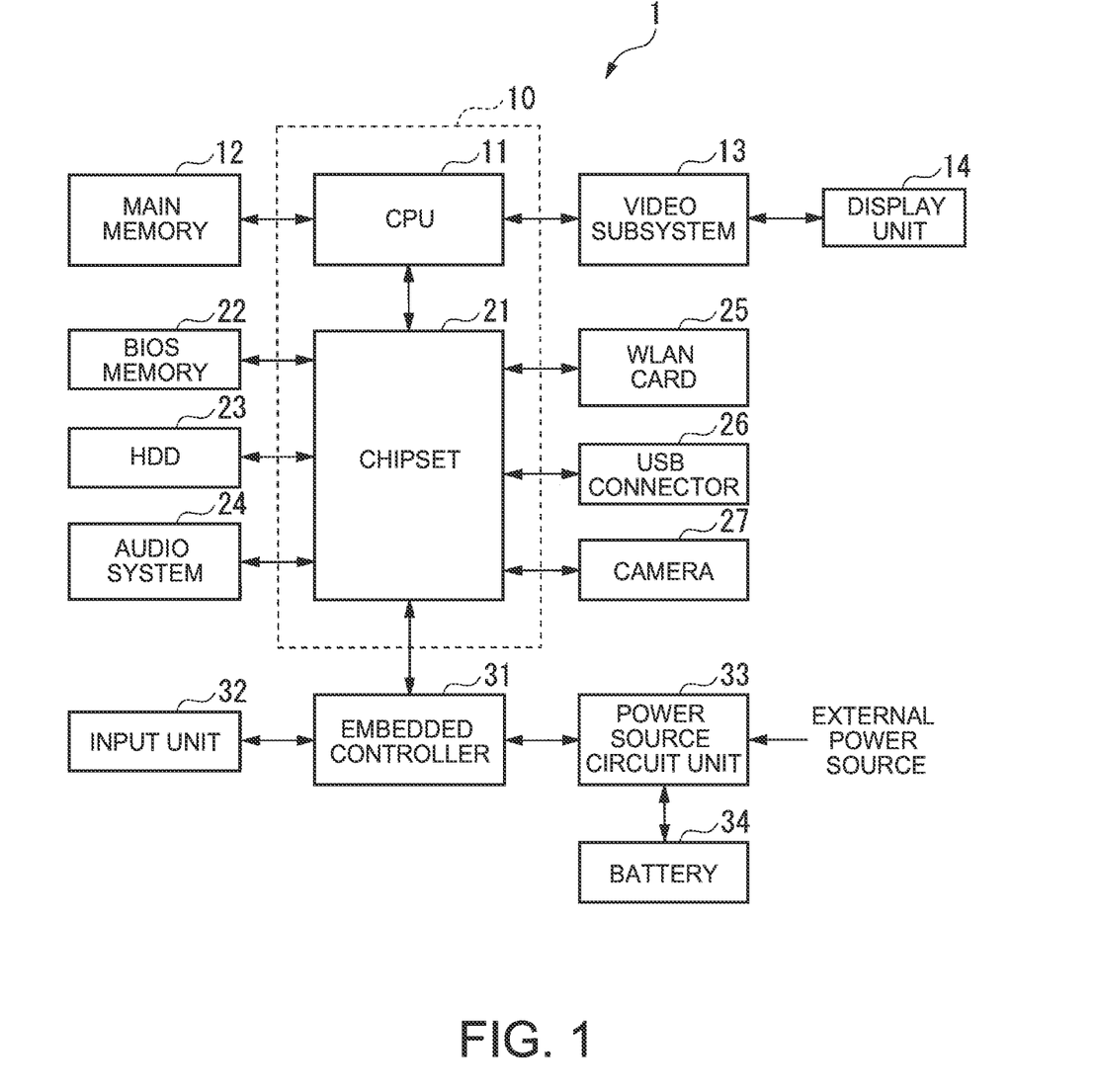
FIG. 1 is a block diagram illustrating an example of a functional configuration of a laptop PC according to the present embodiment.

FIG. 1 is a diagram illustrating an example of a main hardware configuration of a laptop PC 1 according to a first embodiment. In the present embodiment, the laptop PC 1 will be described as an example of the information processing apparatus.

As illustrated in FIG. 1, the laptop PC 1 includes a CPU 11, a main memory 12, a video subsystem 13, a display unit 14, a chipset 21, a BIOS memory 22, an HDD 23, an audio system 24, a WLAN card 25, a USB connector 26, a camera 27, an embedded controller 31, an input unit 32, a power source circuit unit 33, and a battery 34.

In the present embodiment, the CPU 11 and the chipset 21 correspond to a main control unit 10.

The central processing unit (CPU) 11 executes various computation processes by program control and controls the entire laptop PC 1.

The main memory 12 is a writable memory used as a read area for an execution program of the CPU 11 or a work area for writing processing data of the execution program. The main memory 12 is configured by, for example, a plurality of Dynamic Random Access Memory (DRAM) chips. This execution program includes an OS, various drivers for hardware-operating a peripheral device, various services/utilities, an application program, and the like.

The video subsystem 13 is a subsystem of realizing a function related to image display, and includes a video controller. The video controller processes a drawing command from the CPU 11, writes the processed drawing information into a video memory, reads the drawing information from the video memory, and outputs the drawing information to the display unit 14 as drawing data (display data).

The display unit 14 is, for example, a liquid crystal display, and displays a display screen based on the drawing data (the display data) output from the video subsystem 13.

The chipset 21 includes a controller such as a universal serial bus (USB), a serial AT attachment (ATA), a serial peripheral interface (SPI) bus, a peripheral component interconnect (PCI) bus, a PCI-Express bus, and an embedded serial peripheral interface (eSPI) bus (or a low pin count (LPC) bus) or the like, and a plurality of devices are connected to the chipset 21. In FIG. 1, as examples of the devices, the BIOS memory 22, the HDD 23, the audio system 24, the WLAN card 25, the USB connector 26, and the camera 27 are connected to the chipset 21.

The basic input output system (BIOS) memory 22 is configured by an electrically rewritable non-volatile memory such as an electrically erasable programmable read only memory (EEPROM) or a flash ROM. The BIOS memory 22 stores system firmware for controlling a BIOS, the embedded controller 31, and the like.

The HDD (Hard Disk Drive) 23 (an example of a non-volatile storage device) stores an OS, various drivers, various services/utilities, application programs, and various types of data.

The audio system 24 records, reproduces, and outputs sound data.

The wireless local area network (WLAN) card 25 is connected to a network through a wireless LAN to perform data communication. For example, when receiving data from the network, the WLAN card 25 generates an event trigger indicating that the data is received.

The USB connector 26 is a connector for connecting peripheral devices using USB.

The camera 27 is a web camera, for example, and captures an image. The camera 27 is connected to the chipset 21 through a USB interface.

The embedded controller 31 (an example of a sub-control unit) is a one-chip microcomputer which monitors and controls various devices (peripheral devices, sensors, and the like) regardless of a system state of the laptop PC 1. The embedded controller 31 is a sub-control unit different from the main control unit 10 which executes a main process of a system, and controls a low power consumption state of the system. The embedded controller 31 has a power source management function for controlling the power source circuit unit 33.

The embedded controller 31 includes a CPU, a ROM, a RAM, and the like (not illustrated), and includes A/D input terminals, D/A output terminals, timers, and digital input/output terminals with a plurality of channels. For example, the input unit 32 and the power source circuit unit are connected to the embedded controller 31 via the input/output terminals, and the embedded controller 31 controls these operations. The function of the embedded controller 31 according to the present embodiment will be described below in detail with reference to FIG. 2.

The embedded controller 31 controls the power source circuit unit 33 in accordance with a system state (for example, an S0 state to an S5 state) defined in an advanced configuration and power interface (ACPI) specification. Here, the S0 state is the most active state and is a normal working state (a normal operating state). The S3 state is a sleep state, and the S4 state is a hibernation state (a dormant state). The S5 state is a shutdown state (a power source-off state) in which a power source of the main control unit 10 or the like is turned off by software.

In the present embodiment, the low power consumption state of the system includes an S0ix state, the S3 state, the S4 state, and the like.

The CPU 11 of the present embodiment supports the S0ix state, which is a low power consumption state capable of quickly returning to the S0 state, and the embedded controller 31 executes control of the power source circuit unit 33 corresponding to a standby mode (for example, a modern standby mode) using the S0ix state. Here, the S0ix state is an extended state of the S0 state defined in the ACPI specification, and is an S0ix state in which power consumption is reduced as compared with the S0 state. In the S0ix state, it is possible to execute a predetermined process in a background while realizing low power consumption by stopping display and the like of the display unit 14.

For example, the input unit 32 is a pointing device such as a keyboard or an input device such as a touchpad.

The power source circuit unit 33 includes, for example, a DC/DC converter, a charge/discharge unit, and the like, and converts a DC voltage supplied from an AC/DC adapter or the battery 34 into a plurality of voltages necessary for operating the laptop PC 1. Further, the power source circuit unit 33 supplies power to each unit of the laptop PC 1 based on control from the embedded controller 31. The detailed configuration of the power source circuit unit 33 will be described below with reference to FIG. 2.

The battery 34 is, for example, a lithium ion battery, and is charged by an external power source in a case where the external power source is supplied from the AC/DC adapter and outputs output power of the battery 34 as an operating power source of the laptop PC 1 in a case where the external power source is not supplied.

Next, a detailed configuration of the power source circuit unit 33 according to the present embodiment will be described with reference to FIG. 2.

Figure 2:
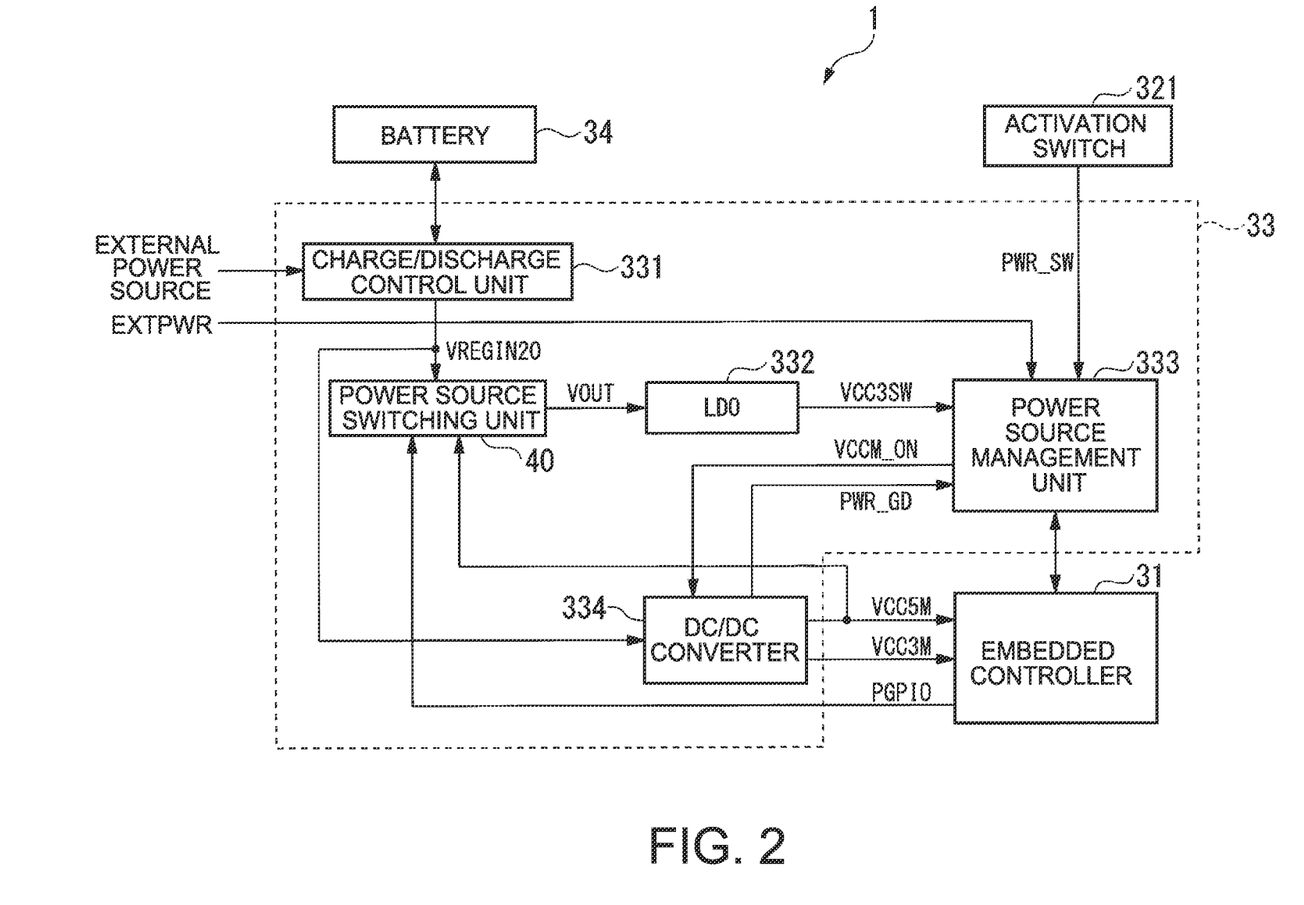
FIG. 2 is a block diagram illustrating a configuration example of a power source circuit unit in the present embodiment.

FIG. 2 is a block diagram illustrating a configuration example of the power source circuit unit 33 in the present embodiment.

As illustrated in FIG. 2, the power source circuit unit 33 is connected to the battery 34 and the embedded controller 31, and includes a charge/discharge control unit 331, a low drop out (LDO) 332, a power source management unit 333, a DC/DC converter 334 and a power source switching unit 40.

The charge/discharge control unit 331 is a charge/discharge unit, and controls charge/discharge of the battery 34 by the external power source, and supplies a VREGIN20 power source (a supply voltage power source) having a predetermined supply voltage (for example, a 20V system voltage) based on the external power source to each unit such as the power source switching unit 40 and the like of the laptop PC 1 in a case where the AC/DC adapter or the like is connected and the external power source is supplied. Further, in a case where the external power source is not supplied, the charge/discharge control unit 331 supplies the VREGIN20 power source having the 20V system voltage based on power supplied from the battery 34 to each unit such as the power source switching unit 40 of the laptop PC 1.

The DC/DC converter 334 (an example of a first power source generation unit) generates a 5V system voltage (a first voltage) lower than the 20V system voltage from the VREGIN20 power source, for example, and outputs the 5V system voltage to each unit of the laptop PC 1 as a VCC5M power source (a first voltage power source). Further, the DC/DC converter 334 generates a 3V system voltage lower than the 20V system voltage from the VREGIN20 power source, and outputs the 3V system voltage to each unit of the laptop PC 1 as a VCC3M power source.

The DC/DC converter 334 controls an output and a stop of the VCC5M power source and the VCC3M power source by a VCCM_ON signal from the power source management unit 333 to be described below. Further, in a case where the outputs of the VCC5M power source and the VCC3M power source become a voltage equal to or higher than a predetermined threshold value, the DC/DC converter 334 outputs a High state to a power good signal (a PWR_GD signal).

The LDO 332 (an example of a second power source generation unit) is a voltage drop type regulator, and generates a 3V system voltage (a second voltage) lower than the 5V system voltage from a VOUT power source output by the power source switching unit 40 to be described below, and outputs the 3V system voltage as a VCC3SW power source (a second voltage power source). Here, the 3V system voltage of the VCC3SW power source is used at least when activating the system. The LDO 332 supplies, for example, the VCC3SW power source to the power source management unit 333. The LDO 332 constantly outputs the 3V system voltage as the VCC3SW power source regardless of a power source state and a system state.

The power source management unit 333 is, for example, a power management hub (PMH), and manages an output and a stop of various power sources. The power source management unit 333 obtains whether or not the laptop PC 1 receives supply of the external power source from an EXTPWR signal, and changes a process of whether or not to stop the VCCSM power source and the VCC3M power source according to whether or not the supply of the external power source is received.

For example, in a case where the EXTPWR signal is in a High state, the power source management unit 333 determines that the supply of the external power source is received, sets the VCCM_ON signal to the High state, and constantly outputs the VCCSM power source and the VCC3M power source.

The EXTPWR signal is an output signal of a sensor (not illustrated) which detects that an AC/DC adapter is connected to the laptop PC 1 and the external power source is supplied.

Further, for example, in a case where the EXTPWR signal is in a Low state, the power source management unit 333 determines that the supply of the external power source is not received, sets the VCCM_ON signal to the Low state according to the system state, and stops the outputs of the VCCSM power source and the VCC3M power source.

The power source management unit 333 operates by the VCC3SW power source, the EXTPWR signal is in a Low state, and causes the DC/DC converter 334 to output the VCCSM power source in a case where an activation request for activating the system is received. For example, in a case where an activation switch 321 is pressed and a PWR_SW signal is in a High state as the activation request, the power source management unit 333 sets the VCCM_ON signal to the High state and causes the DC/DC converter 334 to output the VCCSM power source and the VCC3M power source.

Further, in a case where the EXTPWR signal is in the Low state and a stop request of the VCC5M power source and the VCC3M power source is received from the embedded controller 31, the power source management unit 333 sets the VCCM_ON signal to the Low state and causes the DC/DC converter 334 to stop the outputs of the VCC5M power source and the VCC3M power source.

In a case where the DC/DC converter 334 outputs the VCC5M power source, the power source switching unit 40 switches the VREGIN20 power source with the VCC5M power source and supplies the VCC5M power source to the LDO 332, and the LDO 332 generates a VCC3SW power source from the VCC5M power source. Further, in a case where the DC/DC converter 334 stops the output of the VCC5M power source, the power source switching unit 40 supplies the VREGIN20 power source to the LDO 332, and the LDO 332 generates a VCC3SW power source from the VREGIN20 power source.

For example, in a case where the embedded controller 31 sets a PGPIO signal to a High state, the power source switching unit 40 outputs the VCC5M power source to the LDO 332 as a VOUT power source (a VOUT signal). Further, for example, in a case where the embedded controller 31 sets the PGPIO signal to a Low state, the power source switching unit 40 outputs the VREGIN20 power source to the LDO 332 as the VOUT power source (the VOUT signal).

The detailed configuration of the power source switching unit 40 will be described below with reference to FIG. 3.

As illustrated in FIG. 2, the VCCSM power source and the VCC3M power source are supplied from the DC/DC converter 334 to the embedded controller 31, and the embedded controller 31 operates with these power sources. As control of the power source circuit unit 33, for example, when outputs of the VCC5M power source and the VCC3M power source are started by the DC/DC converter 334, the embedded controller 31 starts an operation, and after the output of the VCC5M power source is started, the embedded controller 31 performs control of causing the power source switching unit 40 to switch a power source to be supplied to the LDO 332 from the VREGIN20 power source to the VCC5M power source. Specifically, in this case, the embedded controller 31 sets the PGPIO signal to a High state.

Further, in a case where the outputs of the VCC5M power source and the VCC3M power source are stopped such as a case where a request of transition to the S4 state (the hibernation state) or the S5 state (the shutdown state) is received from the system, the embedded controller 31 performs control of causing the power source switching unit 40 to the power source to be supplied to the LDO 332 from the VCC5M power source to the VREGIN20 power source. Specifically, in this case, the embedded controller 31 sets the PGPIO signal to a Low state. After performing control to switch the VCCSM power source with the VREGIN20 power source, the embedded controller 31 outputs a stop request of the VCCSM power source and the VCCSM power source to the power source management unit 333.

Next, a detailed configuration of the power source switching unit 40 according to the present embodiment will be described with reference to FIG. 3.

Figure 3:
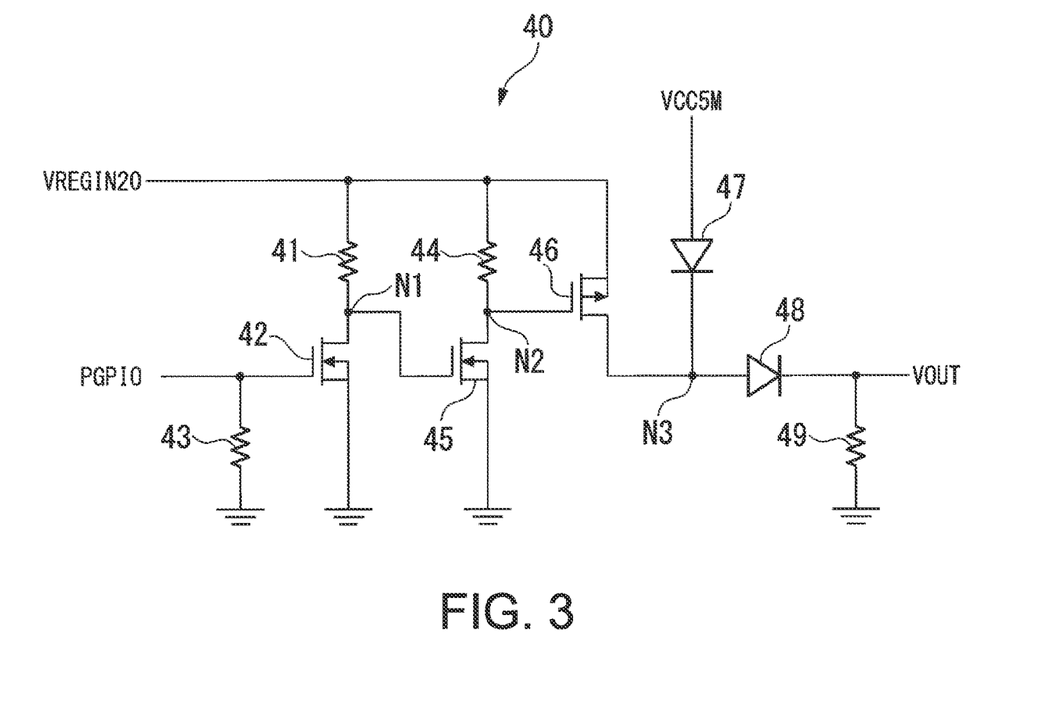
FIG. 3 is a diagram illustrating a configuration example of a power source switching unit in the present embodiment.

FIG. 3 is a diagram illustrating a configuration example of the power source switching unit 40 in the present embodiment.

As illustrated in FIG. 3, the power source switching unit 40 includes resistors (41, 43, 44, and 49), N-channel metal-oxide-semiconductor field-effect transistors (NMOSFETs) (42 and 45), a P-channel MOSFET (PMOSFET) 46 and diodes (47 and 48).

The resistor 41 is connected between a VREGIN20 power source line and a node N1, and functions as a pull-up resistor by the VREGIN20 power source. The resistor 41 sets the node N1 to a High state in a case where the NMOSFET 42 is in an OFF state. Here, the VREGIN20 power source indicates a power source line of the VREGIN20 power source. Further, a predetermined voltage based on either power supplied from the battery 34 or power supplied from the external power source by the charge/discharge control unit 331 is supplied to the VREGIN20 power source.

The NMOSFET 42 has a source terminal connected to a ground line, a drain terminal connected to the node N1, and a gate terminal connected to a PGPIO signal line. In a case where the PGPIO signal line is in a High state, the NMOSFET 42 is in an ON state, and the node N1 is in a Low state. Further, in a case where the PGPIO signal line is in a Low state, the NMOSFET 42 is in an OFF state, and the node N1 is in the High state by a pull-up function of the resistor 41 described above.

The resistor 43 is connected between the PGPIO signal line and a ground line, and functions as a pull-down resistor. The PGPIO signal line is connected to the embedded controller 31, and in a case where the VCCSM power source and the VCC3M power source stop and the operation of the embedded controller 31 stops, the resistor 43 sets the PGPIO signal line to a Low state.

The resistor 44 is connected between the VREGIN20 power source line and a node N2, and functions as a pull-up resistor by the VREGIN20 power source. The resistor 44 sets the node N2 to a High state in a case where the NMOSFET 45 is in an OFF state.

The NMOSFET 45 has a source terminal connected to a ground line, a drain terminal connected to the node N2, and a gate terminal connected to the node N1. In a case where the node N1 is in a High state, the NMOSFET 45 is in an ON state, and the node N2 is in a Low state. Further, in a case where the node N1 is in a Low state, the NMOSFET 45 is in an OFF state, and the node N2 is in the High state by a pull-up function of the resistor 44 described above.

The PMOSFET 46 (an example of a switch element) has a source terminal connected to the VREGIN20 power source line, a drain terminal connected to a node N3, and a gate terminal (a control terminal) connected to the node N2. The PMOSFET controls connection between the VREGIN20 power source line and a VOUT signal line (a power source output line) which supplies a power source to the LDO 332 according to a state of the gate terminal (the control terminal). In a case where the node N2 is in a High state, the PMOSFET 46 is in an OFF state, and electrically disconnects (sets to a non-conduction state) between the VREGIN20 power source line and the node N3 (the VOUT signal line). Further, in a case where the node N2 is in a Low state, the PMOSFET 46 is in an ON state, and electrically connects (sets to a conduction state) between the VREGIN20 power source line and the node N3 (the VOUT signal line).

The diode 47 has an anode terminal connected to a VCCSM power source line and a cathode terminal connected to the node N3. Here, the VCCSM power source line indicates a power source line of the VCCSM power source. The diode 47 is connected from the VCCSM power source to the node N3 (the VOUT signal line) in a forward direction. That is, in a case where a voltage at the node N3 is lower than a voltage of the VCCSM power source (the 5V system voltage), the diode 47 is in an ON state, and supplies the VCCSM power source to the node N3. Further, in a case where the voltage at the node N3 is a voltage of the VREGIN20 power source (the 20V system voltage) higher than the voltage of the VCCSM power source (the 5V system voltage), the diode 47 is in an OFF state, and disconnects the supply of the VCCSM power source to the node N3.

The diode 48 has an anode terminal connected to the node N3 and a cathode terminal connected to the VOUT signal line. The diode 48 prevents the output of the power source switching unit 40 from flowing backward.

The resistor 49 is connected between the VOUT signal line and a ground line, and functions as a pull-down resistor. The VOUT signal line is connected to the LDO 332, and is a power source line of the VOUT signal which supplies either the VREGIN20 power source or the VCCSM power source to the LDO 332.

Next, an operation of the laptop PC 1 according to the present embodiment will be described with reference to drawings.

First, an operation of the power source switching unit 40 according to the present embodiment will be described with reference to FIGS. 3 and 4.

Figure 4:
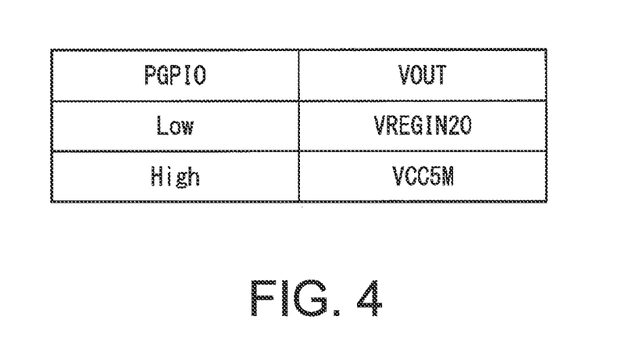
FIG. 4 is a diagram illustrating a switching operation of the power source switching unit in the present embodiment.

FIG. 4 is a diagram illustrating a switching operation of the power source switching unit 40 in the present embodiment.

As illustrated in FIG. 3 and FIG. 4, when the embedded controller 31 sets the PGPIO signal to a Low state, the NMOSFET 42 is in an OFF state, and the node N1 is in a High state by the resistor 41. Further, when the node N1 is in a High state, the NMOSFET 45 is in an ON state and the node N2 is in a Low state. When the node N2 is in a Low state, the PMOSFET 46 is in an ON state, the VREGIN20 power source is supplied to the node N3, and the VREGIN20 power source is output to the VOUT signal line via the diode 48. In this case, the diode 47 is in an OFF state. In this manner, the power source switching unit 40 outputs the VREGIN20 power source to the VOUT signal line in a case where the PGPIO signal is in a Low state (see FIG. 4).

Further, when the embedded controller 31 sets the PGPIO signal to a High state, the NMOSFET 42 is in an ON state, and the node N1 is in a Low state. When the node N1 is in a Low state, the NMOSFET 45 is in an OFF state and the node N2 is in a High state by the resistor 44. Further, when the node N2 is in a High state, the PMOSFET 46 is in an OFF state. In this case, the VCCSM power source is supplied to the node N3 via the diode 47, and the VCCSM power source is output to the VOUT signal line via the diode 48. In this manner, the power source switching unit 40 outputs the VCCSM power source to the VOUT signal line in a case where the PGPIO signal is in a High state (see FIG. 4).

Next, an operation of the power source circuit unit 33 according to the present embodiment will be described with reference to FIGS. 2 and 5.

Figure 5:
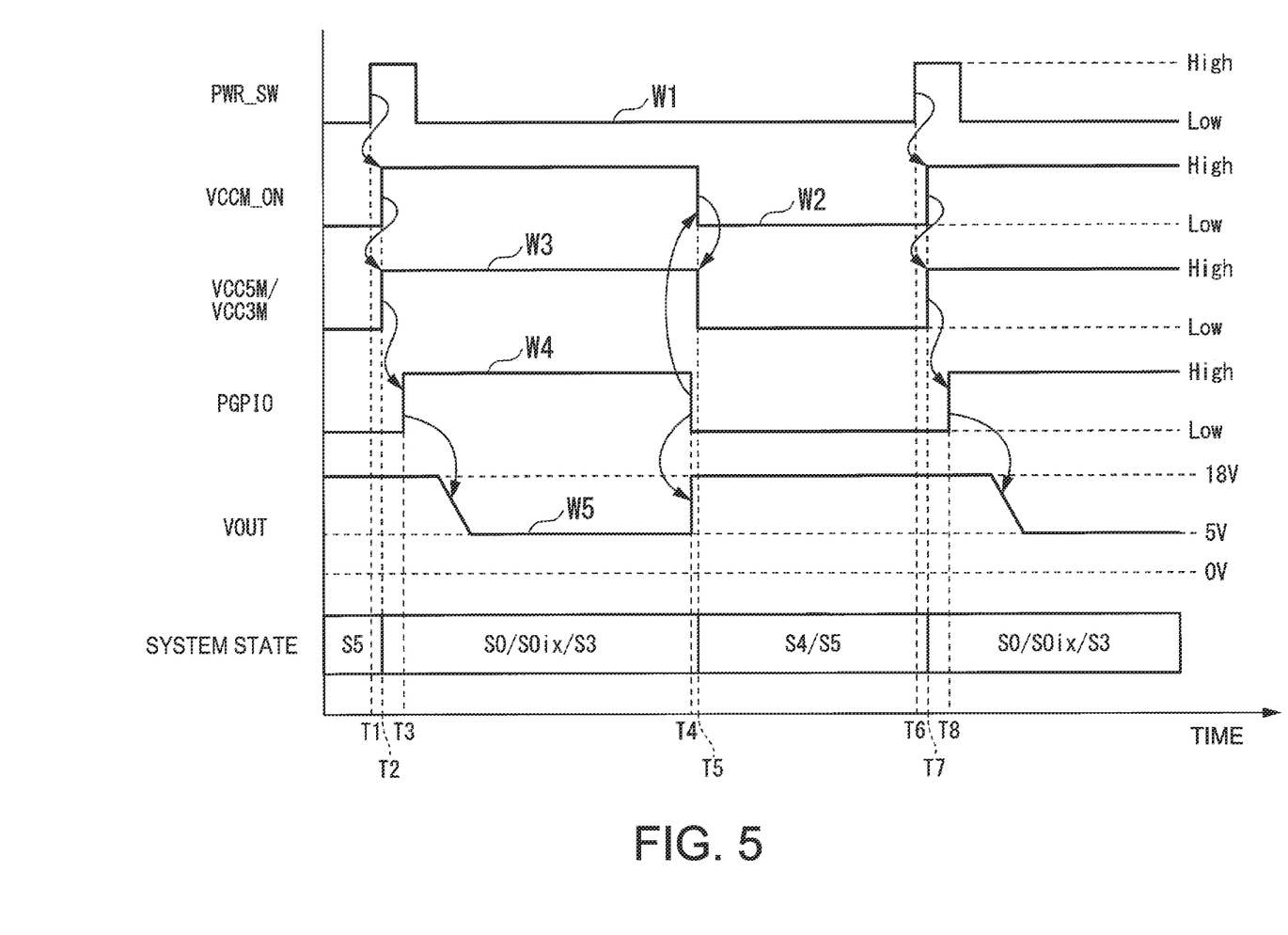
FIG. 5 is a timing chart illustrating an example of an operation of the power source circuit unit in the present embodiment.

FIG. 5 is a timing chart illustrating an example of an operation of the power source circuit unit 33 in the present embodiment.

In FIG. 5, waveforms W1 to W5 respectively indicate voltage waveforms of the PWR_SW signal, the VCCM_ON signal, the VCCSM power source (or the VCC3M power source), the PGPIO signal, and the VOUT signal from top to bottom. A system state indicates a state of the system. Further, a horizontal axis indicates a time.

In the example illustrated in FIG. 5, it is assumed that the EXTPWR signal indicates a state in which an external power source is not connected (a state in which the external power source is not supplied).

In the example illustrated in FIG. 5, the system state of an initial state is the S5 state (the shutdown state), and the VCCSM power source and the VCC3M power source are in a stop state. For this reason, the embedded controller 31 stops an operation, and the PGPIO signal is in a Low state. As a result, a voltage (for example, 18 V) of the VREGIN20 power source is output to the VOUT signal line.

When the activation switch 321 is pressed and the PWR_SW signal is in a High state at a time T1 (see the waveform W1), the power source management unit 333 sets the VCCM_ON signal in a High state at a time T2 (see the waveform W2). Accordingly, the DC/DC converter 334 starts outputs of the VCCSM power source and the VCC3M power source (see the waveform W3). When the DC/DC converter 334 outputs the VCCSM power source and the VCC3M power source, the embedded controller 31 starts the operation, the system state shifts to the S0 state (a normal working state), and the PGPIO signal is in a High state at a time T3 (the Waveform W4).

Accordingly, the power source switching unit 40 switches the VREGIN20 power source with the VCCSM power source, and outputs, for example, 5 V to the VOUT signal (see the waveform W5). In this manner, in the S0 state, the power source switching unit 40 outputs a voltage of the VCCSM power source to the VOUT signal, and the LDO 332 generates a VCC3SW power source from the voltage of the VCCSM power source.

In addition to the S0 state, in the S0xi state (the modern standby mode) and the S3 state (the sleep state), in the same manner, the power source switching unit 40 outputs the voltage of the VCCSM power source to the VOUT signal.

Next, at a time T4, in a case where the main control unit 10 requests the embedded controller 31 to shift to the S4 state (the hibernation state) or the S5 state (the shutdown state), the embedded controller 31 sets the PGPIO signal to a Low state (the Waveform W4). Accordingly, the power source switching unit 40 switches the VCCSM power source with the VREGIN20 power source, and outputs, for example, 18 V to the VOUT signal (see the waveform W5).

In this manner, the power source switching unit 40 outputs a voltage of the VREGIN20 power source to the VOUT signal, and the LDO 332 generates a VCC3SW power source from the voltage of the VREGIN20 power source.

Next, at a time T5, the embedded controller 31 outputs a stop request of the VCCSM power source and the VCC3M power source to the power source management unit 333, and the power source management unit 333 sets the VCCM_ON signal to a Low state (see the waveform W2). Accordingly, the DC/DC converter 334 stops outputs of the VCC5M power source and the VCC3M power source (see the waveform W3), and the embedded controller 31 stops the operation. Accordingly, the system state is shifted to the S4 state or the S5 state.

Next, when the activation switch 321 is pressed again and the PWR_SW signal is in a High state at a time T6 (see the waveform W1), the power source management unit 333 sets the VCCM_ON signal in a High state at a time T7 (see the waveform W2). Accordingly, the DC/DC converter 334 starts outputs of the VCC5M power source and the VCC3M power source (see the waveform W3). When the DC/DC converter 334 outputs the VCC5M power source and the VCC3M power source, the embedded controller 31 starts the operation, the system state shifts to the S0 state (the normal working state), and the PGPIO signal is in a High state at a time T8 (the Waveform W4).

Accordingly, the power source switching unit 40 switches the VREGIN20 power source with the VCC5M power source again, and outputs, for example, 5 V to the VOUT signal (see the waveform W5).

In this manner, the power source switching unit 40 outputs a voltage of the VCC5M power source to the VOUT signal again, and the LDO 332 generates a VCC3SW power source from the voltage of the VCCSM power source.

Next, an operation of the embedded controller 31 according to the present embodiment will be described with reference to FIG. 6.

Figure 6:
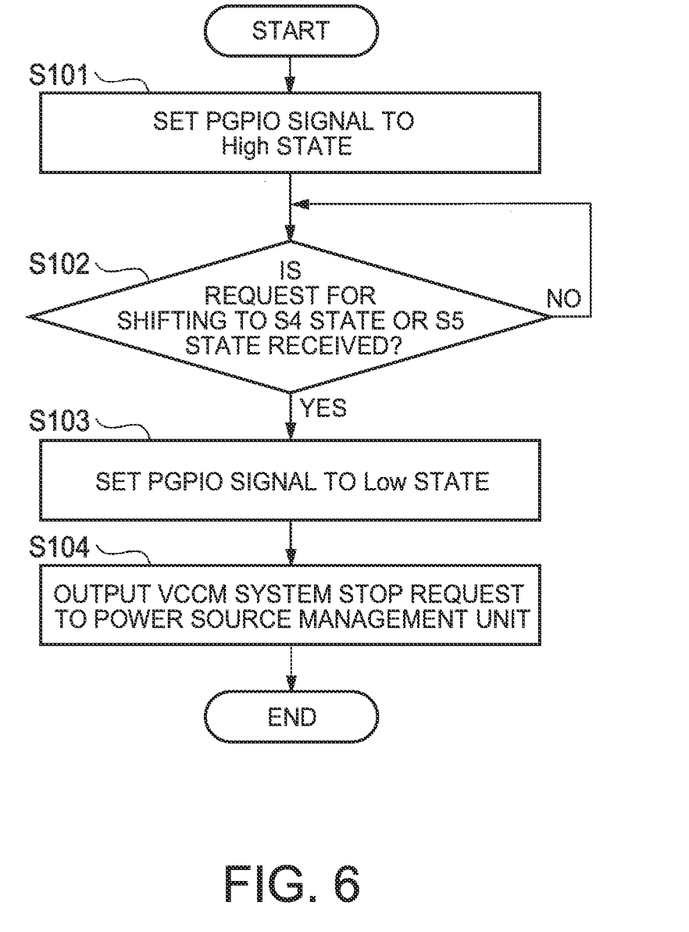
FIG. 6 is a flowchart illustrating an example of an operation of an embedded controller in the present embodiment.

FIG. 6 is a flowchart illustrating an example of an operation of the embedded controller 31 in the present embodiment.

As illustrated in FIG. 6, when the VCCSM power source and the VCCSM power source are supplied to the DC/DC converter 334, the embedded controller 31 starts the operation and sets the PGPIO signal to a High state (step S101). Accordingly, the power source switching unit 40 switches the VREGIN20 power source with the VCCSM power source and outputs the VCCSM power source to the VOUT signal, and the LDO 332 generates a VCC3SW power source from the VCCSM power source.

Next, the embedded controller 31 determines whether or not a request for shifting to the S4 state or the S5 state is received (step S102). The embedded controller 31 determines, for example, whether or not the request for shifting to the S4 state (the hibernation state) or the S5 state (the shutdown state) is received from the main control unit 10 or the activation switch 321. In a case where the request for shifting to the S4 state or the S5 state is received (YES in step S102), the embedded controller 31 proceeds the process to step S103. In a case where no request for shifting to the S4 state and the S5 state is received (NO in step S102), the embedded controller 31 returns the process to step S102.

In step S103, the embedded controller 31 sets the PGPIO signal to a High state. Accordingly, the power source switching unit 40 switches the VCCSM power source with the VREGIN20 power source and outputs the VREGIN20 power source to the VOUT signal, and the LDO 332 generates a VCC3SW power source from the VREGIN20 power source.

Next, the embedded controller 31 outputs a VCCM system stop request to the power source management unit 333 (step S104). The embedded controller 31 outputs a stop request of the VCCSM power source and the VCC3M power source to the power source management unit 333. Accordingly, the power source management unit 333 stops the outputs of the VCCSM power source and the VCC3M power source, and the operation of the embedded controller 31 is also stopped by the stop of the outputs of the VCCSM power source and the VCC3M power source.

Next, an operation of the power source management unit 333 according to the present embodiment will be described with reference to FIG. 7.

Figure 7:
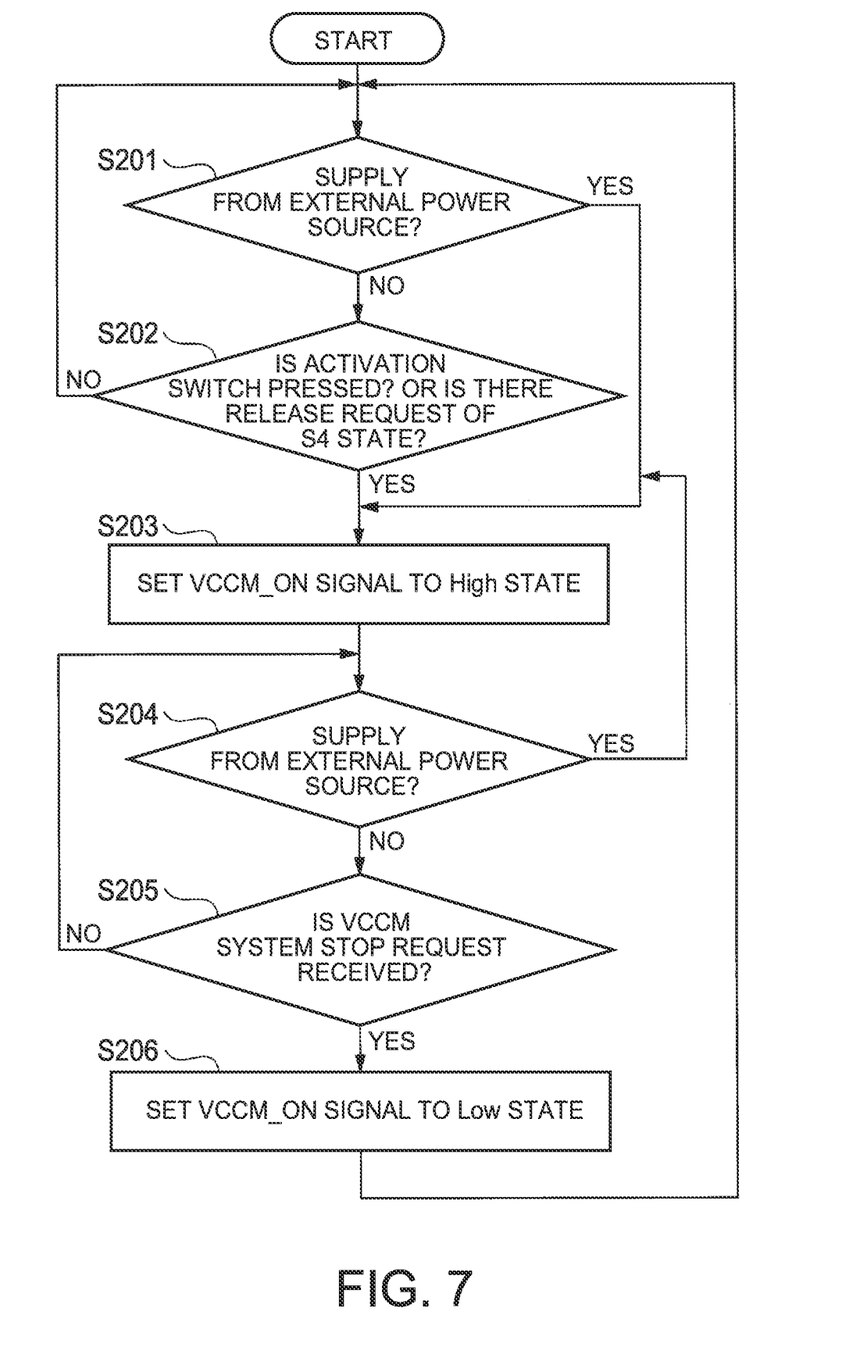
FIG. 7 is a flowchart illustrating an example of an operation of a power source management unit in the present embodiment.

FIG. 7 is a flowchart illustrating an example of an operation of the power source management unit 333 in the present embodiment.

As illustrated in FIG. 7, the power source management unit 333 first determines whether or not an external power source is supplied to the laptop PC 1 (step S201). For example, the power source management unit 333 determines whether the external power source is supplied to the laptop PC 1 based on the EXTPWR signal. The power source management unit 333 proceeds the process to step S203 in a case where the external power source is supplied (YES in step S201). Further, the power source management unit 333 proceeds the process to step S202 in a case where the external power source is not supplied (NO in step S201).

In step S202, the power source management unit 333 determines whether or not the activation switch 321 is pressed or there is a request to release the S4 state. For example, in a case where the PWR_SW signal is in a High state by the activation switch 321 or a case where an output request of the VCCSM power source and the VCC3M power source is received from the embedded controller 31, the power source management unit 333 determines that the activation switch 321 is pressed or there is the release request of the S4 state. In a case where the activation switch 321 is pressed or there is the request to release the S4 state (YES in step S202), the power source management unit 333 proceeds the process to step S203. In a case where the activation switch 321 is not pressed and there is no request to release the S4 state (NO in step S202), the power source management unit 333 returns the process to step S201.

In step S203, the power source management unit 333 sets the VCCM_ON signal to a High state. Accordingly, the DC/DC converter 334 starts outputs of the VCC5M power source and the VCC3M power source.

Next, the power source management unit 333 determines whether or not the external power source is supplied to the laptop PC 1 (step S204). The power source management unit 333 returns the process to step S203 in a case where the external power source is supplied (YES in step S204). Further, the power source management unit 333 proceeds the process to step S205 in a case where the external power source is not supplied (NO in step S204).

In step S205, the power source management unit 333 determines whether or not the VCCM system stop request is received. For example, the power source management unit 333 determines whether or not a stop request of the VCC5M power source and the VCC3M power source is received from the embedded controller 31. The power source management unit 333 proceeds the process to step S206 in a case where the VCCM system stop request is received (YES in step S205). The power source management unit 333 returns the process to step S204 in a case where the VCCM system stop request is not received (NO in step S205).

In step S206, the power source management unit 333 sets the VCCM_ON signal to a Low state. Accordingly, the DC/DC converter 334 stops the outputs of the VCC5M power source and the VCC3M power source. After the process in step S206, the power source management unit 333 returns the process to step S201.

In this manner, in a case where power is supplied from the external power source, the power source management unit 333 causes the DC/DC converter 334 to constantly output the VCCSM power source.

Here, a power source state with respect to a system state according to the present embodiment will be described with reference to FIG. 8.

Figure 8:
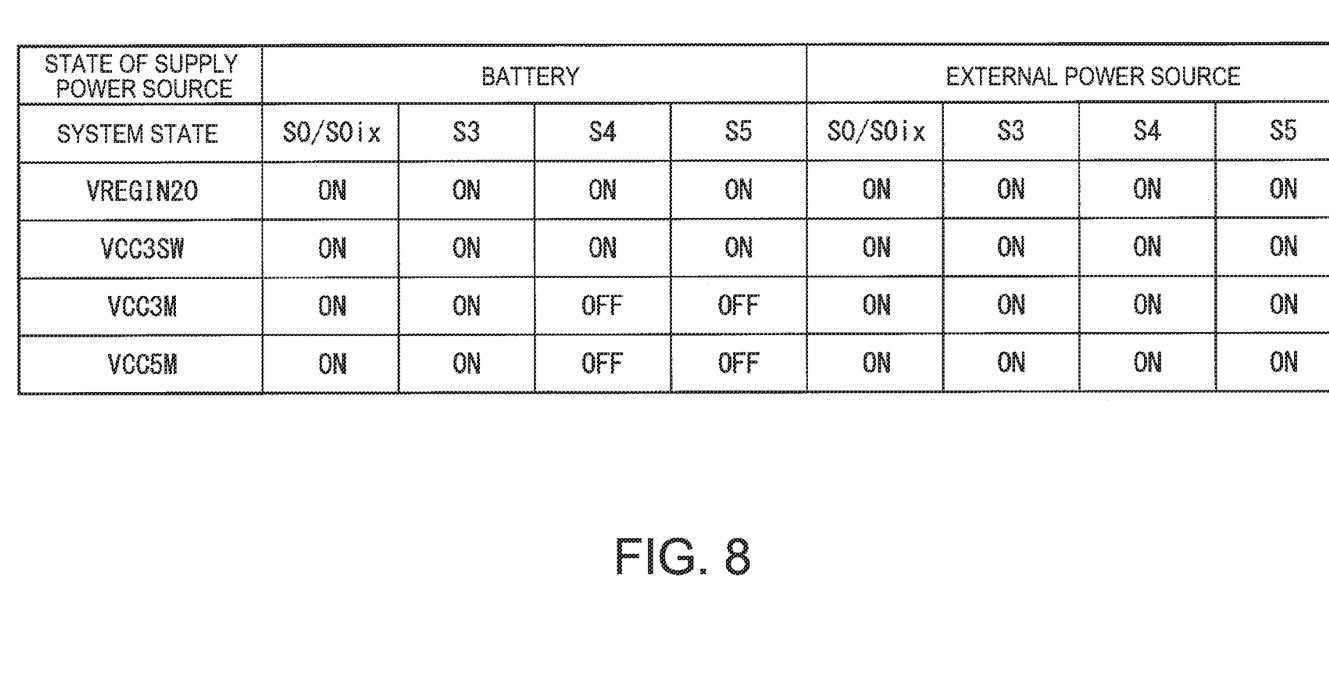
FIG. 8 is a diagram illustrating an example of a power source state with respect to a system state of the laptop PC according to the present embodiment.

FIG. 8 is a diagram illustrating an example of a power source state with respect to a system state of the laptop PC 1 according to the present embodiment.

In FIG. 8, "battery" in a supply power source state indicates a DC mode in which the laptop PC 1 is operated by power supplied from the battery 34, and "external power source" indicates an AC mode in which the laptop PC 1 is operated by power supplied from the external power source by the AC/DC adapter. In each power source, "ON" indicates a state in which the power source is supplied, and "OFF" indicates a state in which the supply of the power source is stopped.

In the laptop PC 1 according to the present embodiment, in a case where the supply power source state is "battery" (the DC mode), the VREGIN20 power source and the VCC3SW power source are constantly supplied. The VCCSM power source and the VCCSM power source are supplied in the S0 state, the S0xi state, and the S3 state, and the supply is stopped in the S4 state and the S5 state.

Further, in the laptop PC 1 according to the present embodiment, in a case where the supply power source state is "external power source" (the AC mode), the VREGIN20 power source, the VCC3SW power source, the VCCSM power source, and the VCCSM power source are constantly supplied regardless of the system state.

As described above, the laptop PC 1 (an information processing apparatus) according to the present embodiment includes the DC/DC converter 334 (the first power source generation unit), the LDO 332 (the second power source generation unit), and the power source switching unit 40. The DC/DC converter 334 generates a 5V system voltage (the first voltage) lower than the 20V system voltage from the VREGIN20 power source (the supply voltage power source) of the 20V system voltage (the predetermined supply voltage) based on at least power supplied from the battery 34, and outputs the 5V system voltage as the VCCSM power source (the first voltage power source). The LDO 332 generates a 3V system voltage (the second voltage) lower than the 5V system voltage and used when at least the system is activated, and outputs the 3V system voltage as the VCC3SW power source (the second voltage power source). In a case where the DC/DC converter 334 outputs the VCCSM power source, the power source switching unit 40 switches the VREGIN20 power source with the VCCSM power source and supplies the VCCSM power source to the LDO 332, and the LDO 332 generates a VCC3SW power source from the VCCSM power source.

Accordingly, in the laptop PC 1 according to the present embodiment, since the DC/DC converter 334 outputs the VCC5M power source in, for example, a low power consumption state such as the S0xi state (the modern standby mode) or the S3 state (the sleep state), the power source switching unit 40 switches the VREGIN20 power source with the VCC5M power source and supplies the VCC5M power source to the LDO 332, and the LDO 332 generates the VCC3SW power source from the VCC5M power source. Here, in the LDO 332, as a difference between an input voltage and an output voltage is large, a conversion loss becomes larger and power consumption becomes larger. Therefore, the laptop PC 1 according to the present embodiment can reduce power consumption of the LDO 332 by generating the VCC3SW power source from the VCC5M power source. The laptop PC 1 according to the present embodiment can reduce power consumption in the low power consumption state.

Further, since the laptop PC 1 according to the present embodiment can reduce power consumption in the low power consumption state, for example, it is possible to extend a working time (an operating time) of the battery 34 in the low power consumption state.

For example, in the laptop PC 1 according to the present embodiment, by generating the VCC3SW power source from the VCC5M power source, for example, in the S0xi state (the modern standby mode), power consumption can be reduced by approximately 10 mW (milliwatt). Accordingly, in the laptop PC 1 according to the present embodiment, for example, in the S0xi state (the modern standby mode), the working time can be extended by approximately one day.

Further, in the present embodiment, in a case where the DC/DC converter 334 stops the output of the VCC5M power source, the power source switching unit 40 supplies the VREGIN20 power source to the LDO 332, and the LDO 332 generates the VCC3SW power source from the VREGIN20 power source.

Accordingly, the laptop PC 1 according to the present embodiment, for example, since the VCC3SW power source is generated from the VREGIN20 power source in a case where the DC/DC converter 334 stops the output of the VCC5M power source as in the S4 state (the hibernation state) and the S5 state (the shutdown state), the VCC3SW power source can be stably supplied.

Further, the laptop PC 1 according to the present embodiment operates by the VCC3SW power source, and includes the power source management unit 333 which causes the DC/DC converter 334 to output the VCC5M power source in a case of receiving the activation request (for example, a case where the PWR_SW signal is in a High state or the like) of activating the system.

Accordingly, by including the power source management unit 333 which operates by the VCC3SW power source, the laptop PC 1 according to the present embodiment can cause the DC/DC converter 334 to output the VCC5M power source when activating the system without operating the main control unit 10 and the embedded controller 31. Therefore, the laptop PC 1 according to the present embodiment can further reduce power consumption in, for example, the S4 state (the hibernation state) and the S5 state (the shutdown state).

The laptop PC 1 according to the present embodiment is a sub-control unit different from the main control unit 10 which executes a main process of the system, and includes the embedded controller 31 (the sub-control unit) which controls the low power consumption state of the system. After the output of the VCCSM power source is started, the embedded controller 31 performs control of causing the power source switching unit 40 to switch a power source to be supplied to the LDO 332 from the VREGIN20 power source to the VCCSM power source. Further, in a case of stopping the output of the VCCSM power source, after the embedded controller 31 performs control of causing the power source switching unit 40 to switch a power source to be supplied to the LDO 332 from the VCCSM power source to the VREGIN20 power source, the embedded controller 31 outputs the stop request of the VCCSM power source to the power source management unit 333. The power source management unit 333 causes the DC/DC converter 334 to stop the output of the VCCSM power source in response to the stop request of the VCCSM power source.

Accordingly, when the power source switching unit 40 switches the power source to be supplied to the LDO 332 from the VCCSM power source to the VREGIN20 power source, the supply of the VCCSM power source to the embedded controller 31 can be safely stopped so that the output of the VCC3SW power source is not interrupted.

Further, in the present embodiment, a predetermined voltage, based on either power supplied from the battery 34 or power supplied from the external power source, is supplied to the VREGIN20 power source. In a case where power is supplied from the external power source, the power source management unit 333 causes the DC/DC converter 334 to constantly output the VCC5M power source.

Accordingly, the laptop PC 1 according to the present embodiment can constantly operate the embedded controller 31 in a case where power is supplied from the external power source.

Further, in the present embodiment, the power source switching unit 40 includes the PMOSFET 46 (a switch element) which controls connection between a power source line of the VREGIN20 power source and the VOUT signal line (a power source output line) which supplies a power source to the LDO 332 according to a state of the control terminal and the diode 47 connected from the VCC5M power source to the VOUT signal line in a forward direction.

Accordingly, in the laptop PC 1 according to the present embodiment, since the supply from the VREGIN20 power source and the supply from the VCC5M power source are not simultaneously in the OFF state, it is possible to prevent the output of the VCC3SW power source from being interrupted.

In addition, a power source control method according to the present embodiment is a power source control method of the laptop PC 1 including the DC/DC converter 334 and the LDO 332, and includes a power source switching step. Here, the DC/DC converter 334 generates a 5V system voltage lower than the 20V system voltage from the VREGIN20 power source of the 20V system voltage based on at least power supplied from the battery 34, and outputs the 5V system voltage as the VCCSM power source. The LDO 332 generates a 3V system voltage lower than the 5V system voltage and used when at least the system is activated, and outputs the 3V system voltage as the VCC3SW power source. In the power source switching step, in a case where the DC/DC converter 334 outputs the VCCSM power source, the power source switching unit 40 switches the VREGIN20 power source with the VCCSM power source and supplies the VCCSM power source to the LDO 332, and the LDO 332 generates the VCC3SW power source from the VCCSM power source.

Accordingly, the power source control method according to the present embodiment has the same effects as those of the laptop PC 1 according to the present embodiment described above, and can reduce power consumption in a low power consumption state. Further, since the power source control method according to the present embodiment can reduce power consumption in the low power consumption state, for example, it is possible to extend a working time (an operating time) of the battery 34 in the low power consumption state.

The present invention is not limited to the embodiment described above, and various modifications may be made without departing from the spirit of the present invention.

For example, in the embodiment described above, the example in which the information processing apparatus is the laptop PC 1 is described, but the present invention is not limited to this, and another information processing apparatus such as a tablet terminal device or a desktop PC may be used.

In addition, in the embodiment described above, the power source switching unit 40 is not limited to the configuration illustrated in FIG. 3 described above, and may be realized by another configuration. For example, the example in which the diode 47 has the cathode terminal connected to the node N3 (that is, the anode terminal of the diode 48) is described, but the embodiment is not limited thereto. The diode 47 may have the cathode terminal connected to a cathode terminal of the diode 48.

Further, the power source switching unit 40 is configured not to include the diode 48.

In addition, in the embodiment described above, the power source circuit unit 33 is not limited to the configuration illustrated in FIG. 2 described above, and may be realized by another configuration. For example, the power source management unit 333 may include a part or all of the LDO 332 and the DC/DC converter 334. A part or all of the configuration of the power source circuit unit 33 may be realized as an integrated circuit.

Further, the embedded controller 31 may include a part of the configuration of the power source circuit unit 33.

Each component included in the laptop PC 1 described above has a computer system inside. A program for realizing the functions of each component included in the laptop PC 1 described above is recorded on a computer-readable recording medium, and the process of each component included in the laptop PC 1 described above may be performed by reading the program recorded on the recording medium into a computer system and executing the program. Here, "a program recorded on a recording medium is read into a computer system and executed" includes installing the program in the computer system. The "computer system" here includes an OS or hardware such as a peripheral device.

Further, the "computer system" may include a plurality of computer devices connected via a network including a communication line such as the Internet, a WAN, a LAN, or a dedicated line. The "computer-readable recording medium" is, for example, a portable medium such as a flexible disk, a magneto-optical disk, a ROM, a CD-ROM or a storage device such as a hard disk embedded in the computer system. As described above, the recording medium storing the program may be a non-transitory recording medium such as a CD-ROM.

The recording medium also includes a recording medium, provided inside or outside, which can be accessed from a distribution server for distributing the program. The program may be divided into a plurality of parts and downloaded at different timings, and may be combined by each component included in the laptop PC 1, or distribution servers that respectively distribute the divided programs may be different from one another. Further, the "computer-readable recording medium" is a medium which holds the program for a certain period of time, such as a volatile memory (RAM) inside the computer system which becomes a server or a client in a case where the program is transmitted via the network. The program may be for realizing a part of the functions described above. Further, the function described above can be realized by combining the programs already recorded on the computer system, a so-called difference file (a difference program) may be used.

A part or all of the functions described above may be realized as an integrated circuit such as large scale integration (LSI). Each function described above may be individually made into a processor, and some or all of the functions may be integrated into a processor. In addition, a method of circuit integration is not limited to the LSI and may be realized by a dedicated circuit or a general-purpose processor. In a case where an integrated circuit technology being replaced with the LSI appears according to the advancement of a semiconductor technology, an integrated circuit based on the technology may be used.

The invention claimed is:

1. An information processing apparatus comprising:
a first power source generation unit that generates a first voltage lower than a predetermined supply voltage based on at least power supplied from a battery, from a supply voltage power source of the predetermined supply voltage, and outputs the first voltage as a first voltage power source;
a second power source generation unit that generates a second voltage lower than the first voltage and used when at least a system is activated, and outputs the second voltage as a second voltage power source; and
a power source switching unit that switches the supply voltage power source with the first voltage power source to supply the first voltage power source to the second power source generation unit, and causes the second power source generation unit to generate the second voltage power source from the first voltage power source when the first power source generation unit outputs the first voltage power source.

2. The information processing apparatus according to claim 1,
wherein, when the first power source generation unit stops the output of the first voltage power source, the power source switching unit supplies the supply voltage power source to the second power source generation unit, and causes the second power source generation unit to generate the second voltage power source from the supply voltage power source.

3. The information processing apparatus according to claim 1, further comprising:
a power source management unit that operates by the second voltage power source and causes the first power source generation unit to output the first voltage power source when an activation request for activating the system is received.

4. The information processing apparatus according to claim 3, further comprising:
a sub-control unit that is different from a main control unit and that executes a main process of the system, and controls a low power consumption state of the system, wherein the sub-control unit:
controls the power source switching unit to switch a power source supplied to the second power source generation unit from the supply voltage power source to the first voltage power source, wherein the switch occurs after an output of the first voltage power source is started, and
controls the power source switching unit to switch the power source to the second power source generation unit from the first voltage power source to the supply voltage power source, and then to output a stop request of the first voltage power source to the power source management unit when the output of the first voltage power source is stopped, and
the power source management unit causes the first power source generation unit to stop the output of the first voltage power source according to the stop request of the first voltage power source.

5. The information processing apparatus according to claim 3,
wherein the predetermined voltage based on either power supplied from the battery or power supplied from an external power source is supplied to the supply voltage power source, and
when the power from the external power source is supplied, the power source management unit causes the first power source generation unit to constantly output the first voltage power source.

6. The information processing apparatus according to claim 1,
wherein the power source switching unit includes:
a switch element that controls connection between a power source line of the supply voltage power source and a power source output line which supplies a power source to the second power source generation unit according to a state of a control terminal, and
a diode connected from the first voltage power source to the power source output line in a forward direction.

7. A power source control method of an information processing apparatus including a first power source generation unit that generates a first voltage lower than a predetermined supply voltage based on at least power supplied from a battery, from a supply voltage power source of the predetermined supply voltage, and outputs the first voltage as a first voltage power source; and a second power source generation unit that generates a second voltage lower than the first voltage and used when at least a system is activated and outputs the second voltage as a second voltage power source, the method comprising:
switching the supply voltage power source with the first voltage power source to supply the first voltage power source to the second power source generation unit, and causing the second power source generation unit to generate the second voltage power source from the first voltage power source when the first power source generation unit outputs the first voltage power source, by a power source switching unit.

* * * * *